United States Patent
Wang et al.

(10) Patent No.: US 11,645,109 B2
(45) Date of Patent: May 9, 2023

(54) MANAGING FAILURES IN EDGE COMPUTING ENVIRONMENTS

(71) Applicant: International Business Machines Corporation, Armonk, NY (US)

(72) Inventors: Yue Wang, Beijing (CN); Xin Peng Liu, Beijing (CN); Liang Wang, Beijing (CN); Zheng Li, Beijing (CN); Wei Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 17/079,476

(22) Filed: Oct. 25, 2020

(65) Prior Publication Data
US 2022/0129303 A1    Apr. 28, 2022

(51) Int. Cl.
*G06F 9/46* (2006.01)
*G06F 9/48* (2006.01)
*G06F 11/07* (2006.01)
*G06F 9/50* (2006.01)

(52) U.S. Cl.
CPC .......... *G06F 9/4856* (2013.01); *G06F 9/4881* (2013.01); *G06F 9/5038* (2013.01); *G06F 11/0793* (2013.01)

(58) Field of Classification Search
CPC .... G06F 9/4856; G06F 9/4881; G06F 9/5038; G06F 11/0793
USPC ........................................................ 718/102
See application file for complete search history.

(56) References Cited

U.S. PATENT DOCUMENTS

| | | | |
|---|---|---|---|
| 2010/0122065 A1* | 5/2010 | Dean ................... | G06F 16/2379 712/203 |
| 2012/0167101 A1* | 6/2012 | Kandula ............... | G06F 9/5038 718/102 |
| 2016/0098292 A1* | 4/2016 | Boutin .................. | G06F 9/505 718/104 |
| 2017/0132036 A1* | 5/2017 | Busaba ................ | G06F 9/3842 |
| 2020/0136920 A1 | 4/2020 | Doshi et al. | |

(Continued)

FOREIGN PATENT DOCUMENTS

| | | | |
|---|---|---|---|
| GB | 2344906 A * | 6/2000 | ........... G06F 9/4881 |
| GB | 2604203 A | 8/2022 | |
| WO | 2017091960 A1 | 6/2017 | |

OTHER PUBLICATIONS

"Understand extended offline capabilities for IoT Edge devices, modules, and child devices", Azure, 6 pages, Nov. 22, 2019.

(Continued)

*Primary Examiner* — Bradley A Teets
(74) *Attorney, Agent, or Firm* — Grant Johnson (57) ABSTRACT

A computer-implemented method, computer system and computer program product dynamically manage failure in an edge computing environment. According to the method, a request for executing a task may be sent to a first edge device according to a defined process, where the defined process is used to schedule tasks to be executed on edge devices. In response to the first edge device failing to execute the task, the defined process may be suspended. Then, a request for executing the task may be sent to a second edge device. A task result that is received first may be taken as the task result for the task, where the task result is from either the first edge device or the second edge device. And, continuing the rest of the defined process.

14 Claims, 9 Drawing Sheets

(56) References Cited

U.S. PATENT DOCUMENTS

2020/0167196 A1* 5/2020 Smith ................. H04L 41/0843
2020/0169609 A1 5/2020 Wang et al.
2020/0169857 A1 5/2020 Yang et al.
2022/0129306 A1* 4/2022 Wang ................... G06F 9/5038

OTHER PUBLICATIONS

"IXrouter: Edge to Cloud connectivity for Industrial IoT", IXON, 6 pages, Aug. 20, 2019.
Wood, P. et al., "Dependability in Edge Computing", School of Electrical and Computer Engineering Purdue University, 15 pages, Oct. 11, 2017.
Mell, P. et al., "The NIST Definition of Cloud Computing", Recommendations of the National Institute of Standards and Technology, NIST Special Publication 800-145, 7 pages, Sep. 2011.
Combined Search and Examination Report dated Jun. 7, 2022 from GB Application No. GB2114079.3 filed Oct. 1, 2021.
Ouyang, "Intelligent straggler mitigation in massive-scale computing systems", 2018, 3 pps., <https://etheses.whiterose.ac.uk/20619/l/Intelligent%20Straggler%20Miti gation%20in%20Massive-Scale%20Com12uting%20Systems.pdf>.
Symeonides et al, "A study on speculative task scheduling for Apache Spark in fog computing realms", Informatics, 2019, pp. 59-65.

* cited by examiner

MANAGING FAILURES IN EDGE COMPUTING ENVIRONMENTS

BACKGROUND

The present disclosure generally relates to computer techniques and more particularly, to a method, system, and computer program product for dynamically managing failure in an edge computing environment.

With the development of cloud computing and Internet of Things (IoT) technologies, edge computing is becoming an emerging direction to achieve stronger computation capabilities. In the context of IoT, "edge" refers to the computing infrastructure that exists close to the sources of data, for example: industrial machines, industrial controllers, and industrial sensors, mobile devices, etc. The machines/devices that are the sources of data may be referred as edge devices. The edge devices typically reside away from the centralized computing resource available in the cloud. In edge computing, information technology (IT) administrators may move some applications, data processing, and models away from the centralized cloud data centers to edge side, closer to the edge devices, thereby reducing the amount of data traffic to the cloud data centers.

SUMMARY

According to one embodiment of the disclosure, there is provided a computer-implemented method for dynamically managing failure in an edge computing environment. According to the computer-implemented method, a request for executing a task may be sent to a first edge device according to a defined process, wherein the defined process is used to schedule tasks to be executed on edge devices. In response to the first edge device failing to execute the task, the defined process is suspended. Then a request for executing the task is sent to a second edge device. A task result which is received first may be taken as the task result for the task, wherein the task result is from either the first edge device or the second edge device. The method further comprises continuing the rest of the defined process.

According to another embodiment of the disclosure, there is provided a computer system for dynamically managing failure in an edge computing environment. The computer system comprises one or more processors, and a computer-readable memory coupled to the one or more processors. The computer-readable memory comprises instructions that, when executed by the one or more processors, perform actions of the above method.

According to another embodiment of the disclosure, there is provided a computer program product for dynamically managing failure in an edge computing environment. The computer program product comprises a computer readable storage medium having program instructions embodied therewith, the program instructions executable by a processor to cause the processor to perform actions of the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to similar components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
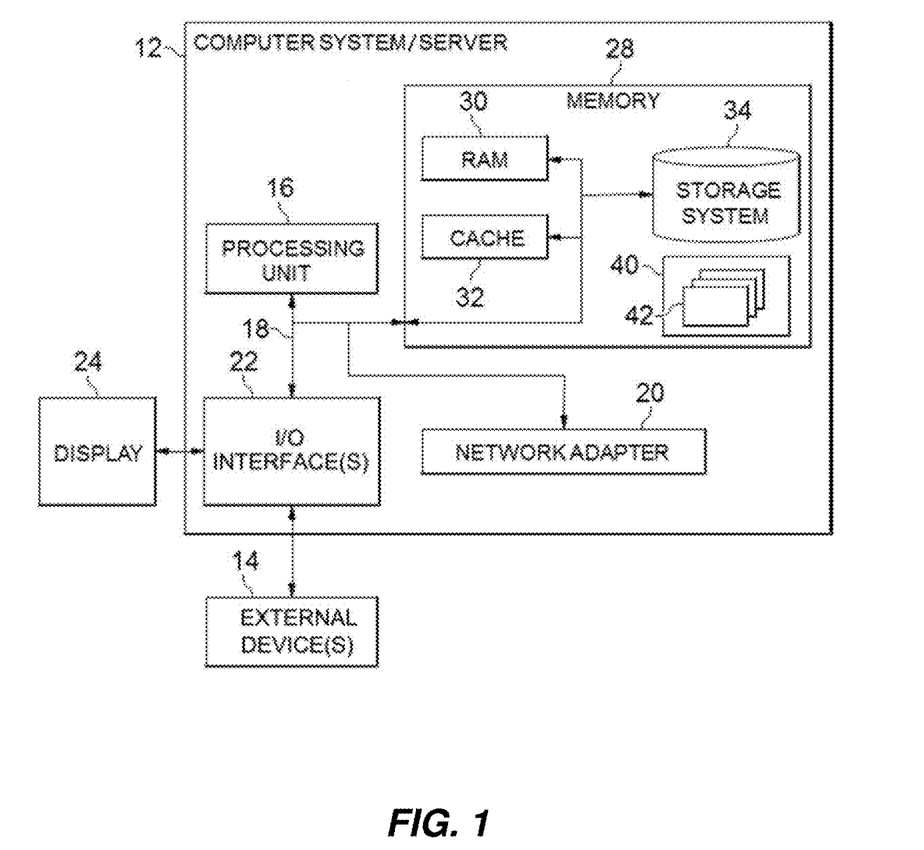
FIG. 1 depicts a schematic of an example of computer system/server according to an embodiment of the disclosure.

Referring now to FIG. 1, a schematic of an example of a computer system/server is shown, which in some embodiments, may be a portable electronic device, such as a communication device, that is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

Some computer system/server 12 embodiments will be described in the general context of computer system-executable instructions, such as program modules, being executed by a computer system. Generally, program modules may include routines, programs, objects, components, logic, data structures, and so on that perform particular tasks or implement particular data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

In FIG. 1, the computer system/server 12 is shown in the form of a general-purpose computing device. The components of computer system/server 12 may include, but are not limited to, one or more processors or processing units 16, a system memory 28, and a bus 18 that couples various system components, including the system memory 28, to the processor 16.

The bus 18 may represent one or more of any of several types of bus structures, including a memory bus or memory controller, a peripheral bus, an accelerated graphics port, and a processor or local bus using any of a variety of bus architectures. By way of example, and not limitation, such architectures may include: Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 may include a variety of computer system readable media. Such media may be any available media that is accessible by the computer system/server 12, and may include both volatile and non-volatile media, and removable and non-removable media.

The system memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to the bus 18 by one or more data media interfaces. As will be further depicted and described below, the memory 28 may include at least one program product having a set (e.g., at least one) of program modules that may be configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment, or components thereof. Program modules 42 generally carry out the functions and/or methodologies of embodiments of the present disclosure as described herein.

The computer system/server 12 may also communicate with one or more external devices 14, such as a keyboard, a pointing device, etc.; a display 24; one or more devices that enable a user to interact with computer system/server 12; and/or one or more devices (e.g., network card, modem, etc.) that enable the computer system/server 12 to communicate with one or more other computing devices. Such communication may occur via Input/Output (I/O) interfaces 22. Still yet, the computer system/server 12 may communicate with one or more networks, such as a local area network (LAN), a general wide area network (WAN), and/or a public network (e.g., the Internet) via a network adapter 20. As depicted, the network adapter 20 may communicate with the other components of the computer system/server 12 via the bus 18. It should be understood that, although not shown, other hardware and/or software components could be used in conjunction with the computer system/server 12. Examples, include, but are not limited to: microcode, device drivers, redundant processing units, external disk drive arrays, RAID systems, tape drives, data archival storage systems, etc.

Figure 2:
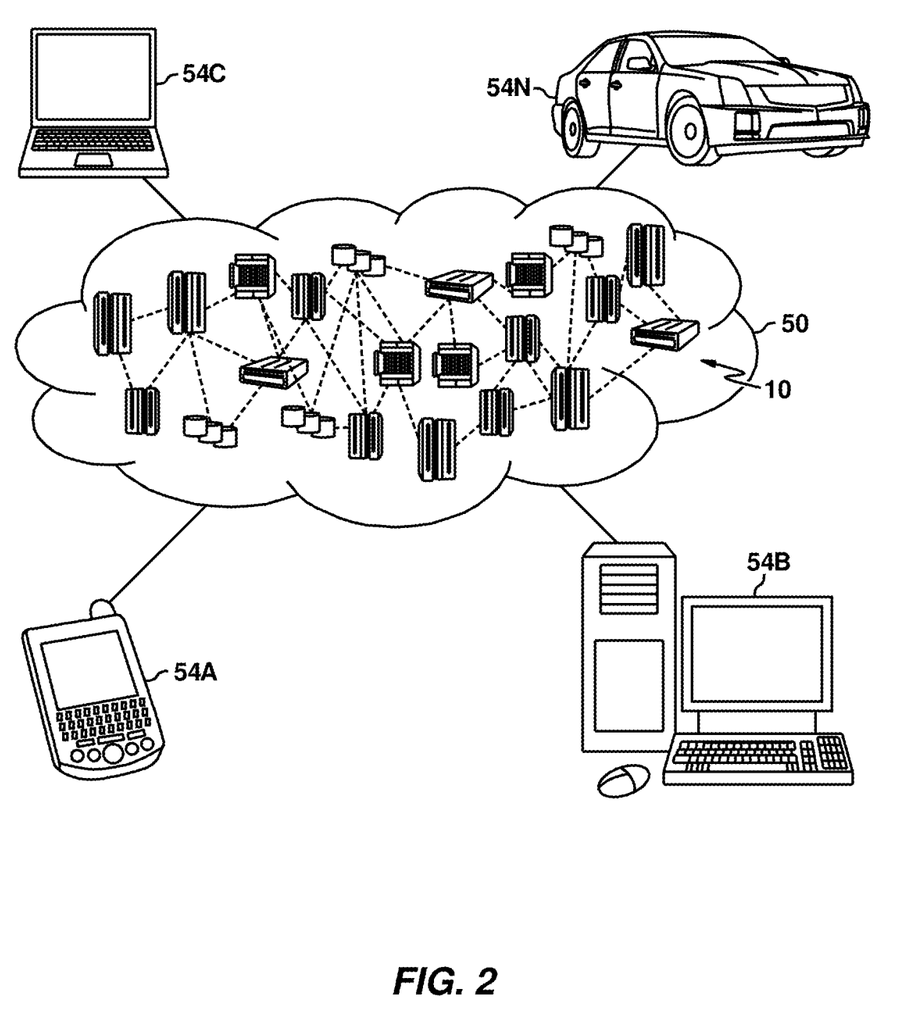
FIG. 2 depicts a cloud computing environment according to an embodiment of the disclosure.

The computer system/server shown in FIG. 1 may be a cloud computing node, such as the cloud computing node 10 shown in FIG. 2. The computer system/server shown in FIG. 1 may also be hardware components in the example edge computing environment shown in FIG. 4 and FIG. 5, in accordance with some illustrative embodiments of the present disclosure.

Referring now to FIG. 2, an illustrative cloud computing environment 50 is depicted, consistent with some embodiments of the disclosure. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
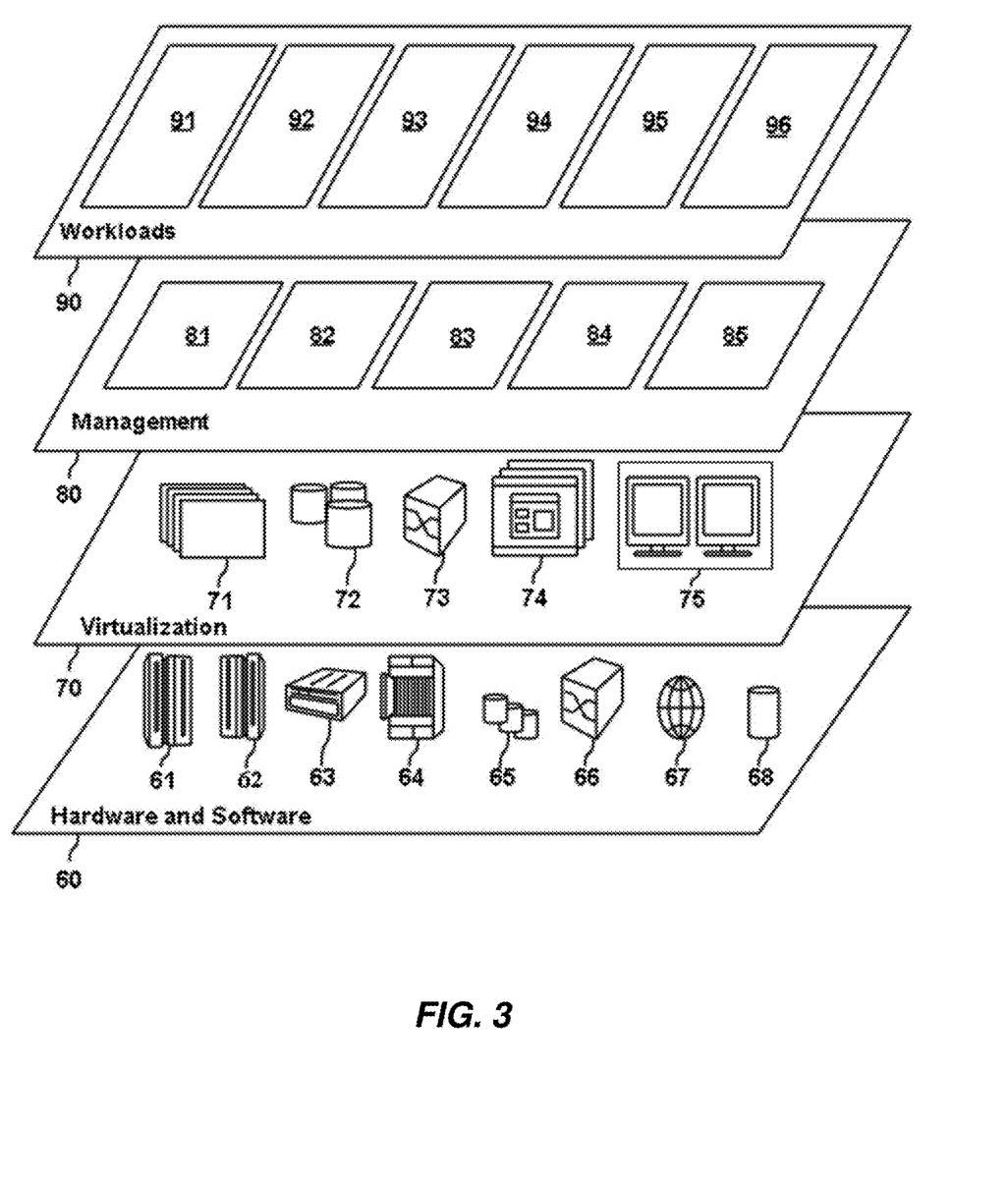
FIG. 3 depicts abstraction model layers according to an embodiment of the disclosure.

Referring now to FIG. 3, a set of functional abstraction layers provided by cloud computing environment 50 (FIG. 2) is shown, consistent with some embodiments of the disclosure. It should be understood in advance that the components, layers, and functions shown in FIG. 3 are intended to be illustrative only and that embodiments of the invention are not limited thereto. As depicted, the following layers and corresponding functions are provided:

Hardware and software layer 60 may include hardware and software components. Examples of hardware components include: mainframes 61; RISC (Reduced Instruction Set Computer) architecture based servers 62; servers 63; blade servers 64; storage devices 65; and networks and networking components 66. In some embodiments, the software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions that may be provided from this layer include: mapping and navigation 91; software development and lifecycle management 92; virtual classroom education delivery 93; data analytics processing 94; transaction processing 95; and edge controller 96.

The functional abstraction layers in FIG. 3 are only for example. When necessary, one or more layers can be added thereto, and one or more layers in FIG. 3 can be merged or omitted. In addition, in each layer of FIG. 3, some components can be omitted or merged, and one or more components can be added.

Example Computing Environment

As mentioned above, with the development of cloud computing and IoT technologies, edge computing is becoming a new emerging direction to achieve stronger and stronger computation capabilities. Edge computing is rapidly becoming an important part of the Industrial Internet of Things (IIoT) and helping to accelerate digital transformation. Intelligent manufacture is a typical example of this trend. In general, edge computing may focus on the devices and technologies that may be actually attached to the 'things,' such as industrial machines, that act as data sources. Edge computing may enable data analytics and gathering to occur at the data sources.

In some applications and embodiments, edge computing may function as an optimization to cloud computing systems and may work together with cloud computing. Scenarios in which edge computing may be beneficial include situations that need low latency or where there are bandwidth constraints. Edge computing may also be important when Internet or cellular connections are spotty. Cloud computing, in contrast, usually takes a more dominant position when actions require significant computing power to effectively manage vast data volumes from machines. However, cloud computing and edge computing may both desirable for many industrial operations to gain the most value from today's sophisticated, varied, and large volume of data. The combination may provide flexibility for industries or server providers to manage and process data from edge devices at the edge, in the cloud, or a combination of the two to achieve optimal operation.

Figure 4:
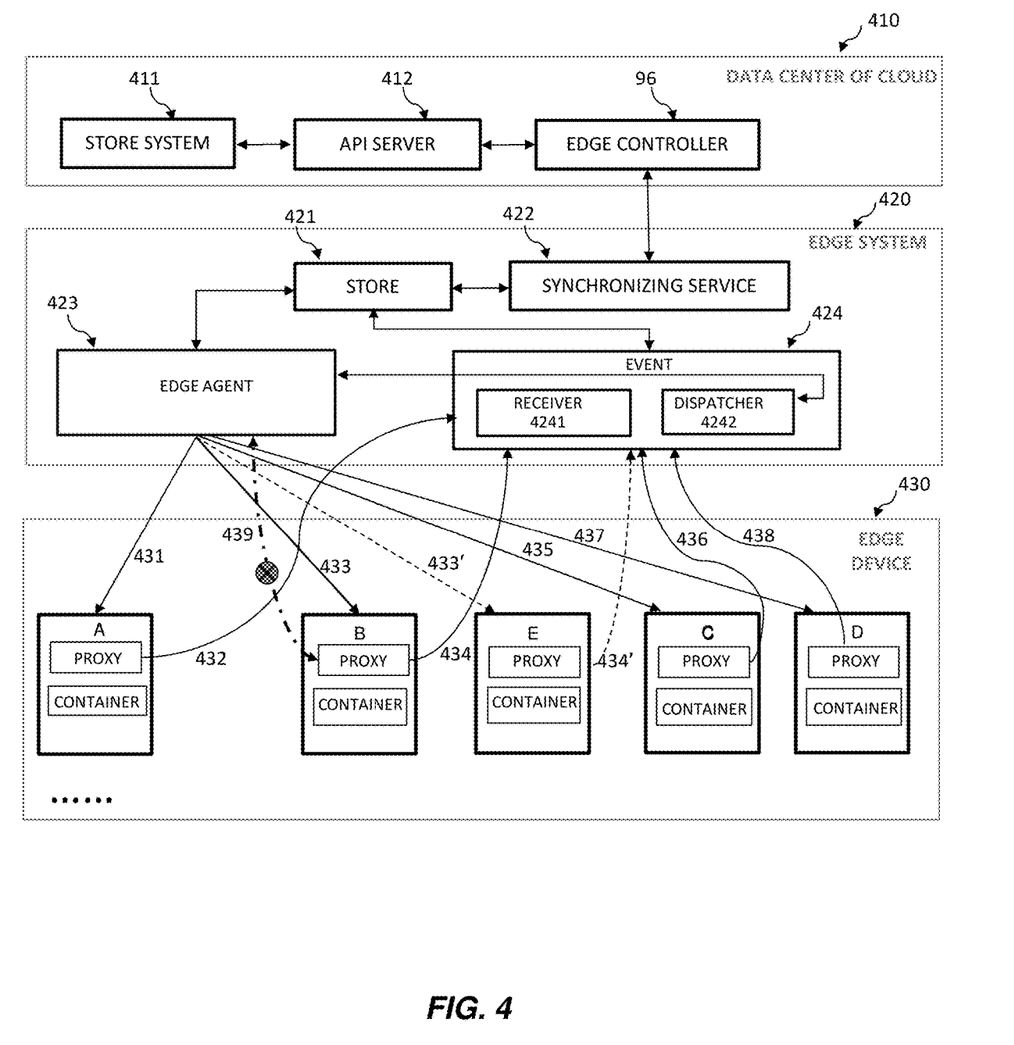
FIG. 4 depicts an example edge computing environment in accordance with some embodiments of the present disclosure.

FIG. 4 illustrates an example edge computing environment, consistent with some embodiments. This example edge computing environment may contain components and/or modules running both on a cloud layer and an edge system layer. It this example edge computing environment, a data center or cloud may be connected with an edge system and edge devices, rather than connected with computing nodes/severs as in the typical cloud computing environment.

As shown in FIG. 4, the example edge computing environment may comprise a data center of cloud layer 410, an edge system layer 420, and an edge devices layer 430. The hardware components in each layer in the example edge computing environment may be the computer system/server 12 shown in FIG. 1. The computer system/server 12 shown in FIG. 1 may be capable of being implemented and/or performing any of the functionality in the example edge computing environment. All components and/or modules in the example edge computing environment may be connected directly or indirectly via a communication network. The network in FIG. 4 may include various types of communication networks, such as a wide area network (WAN), local area network (LAN), a telecommunication network, a wireless network, a public switched network and/or a satellite network. The communication network may include connections, such as wire, wireless communication links, or fiber optic cables, etc.

The layers and modules across the edge computing environment and the number of edge devices depicted in the figures are provided for the purpose of illustration only. Some edge computing environment embodiments may comprise one or more other layers and modules, and the number of edge devices may be different and arranged in other manners.

The data center of cloud layer 410 may belong to the existing cloud computing environment 50, which has been described with reference to FIGS. 2-3 above. In practice, according to actual requirements and conditions of production or service, the cloud computing center may locate part of the desired computing power (e.g., part of models and applications) to edge system 420 to execute management of edge devices 430.

As shown in FIG. 4, the example modules in data center of cloud layer 410 may include a store system 411, an API sever 412, and an edge controller 96. The store system 411 may store metadata needed by the API sever 412. For example, the store system 411 may be a consistent, distributed key-value store. The stored data in the store system 411 may be accessed by a distributed system or machines. The API sever 412 may be used for processing API operations and may be invoked by users. The components in the cloud layer 410 may rely on the API server 412 for message delivery. The edge controller 96 may be used to communicate between a data center of cloud layer 410 and an edge system layer 420 to execute the central management.

In the embodiment in FIG. 4, the example modules in the edge system layer 420 may comprise a store module 421, a synchronizing service module 422, an edge agent module 423, and an event module 424. The store module 421 may store metadata for the edge system 420 and the edge devices 430. The synchronizing service module 422 may be the central data processing module of edge system 420 and may be used to synchronize models and data between the cloud 410 and the edge system 420. The edge agent module 423 and the event module 424 may be management modules of tasks to be executed on edge devices 430. The edge agent 423 may define a process for a request for executing the tasks. The defined process may indicate a mapping relationship between the tasks and respective edge devices adapted to run the tasks. The defined process may be used to schedule tasks to be executed on corresponding edge devices. The tasks to be executed may accomplish a production mission or implement a service function. The event module 424 may further comprise a receiver module 4241 and a dispatcher module 4242. The receiver module 4241 may be used to receive a running result of a task from an edge device. The dispatcher module 4242 may invoke the edge agent 423 to assign a next task to a corresponding edge device according to the defined process. The edge system 420 embodiment in FIG. 4 provides only an illustration of implementation environment and does not imply any limitations with regard to the environments in which different embodiments may be implemented. Many modifications to the illustration environment may be made.

An edge device may be an entry point into enterprise or service provider's core networks. The edge system may process data of the edge devices, and may send the data that has been processed or is suitable for central processing over the network to the data center of the cloud. In this way, massive data transmission of un-processed data over the network may be avoided and the time for central processing may be saved. As shown in FIG. 4, the example edge devices layer 430 may include a plurality of edge devices, such as devices A, B, C, D, and E, etc. The edge devices in this embodiment, in turn, may comprise, e.g., a container and a proxy module. The container may be a service grid or a module to execute requests of tasks. The proxy modules may be used to manage and control the tasks.

The example edge computing environment shown in FIG. 4 may be a serverless computing environment or a platform, of which functions-as-a-service (FaaS) is one example. The serverless computing environment may be triggered by events. A production mission or a service function may be carried out or realized in the edge computing environment. The edge devices may be requested to perform various tasks to accomplish a production mission or to implement a service function. Each edge device may execute a corresponding task. In this way, a process of realizing a production mission or a service function may be a process of executing a series of tasks on corresponding edge devices.

As explained above, the edge agent may define a process for executing the tasks. Once the edge agent receives a request for executing the tasks, the edge agent may dynamically determine which edge devices are adapted to execute the tasks. For example, the adapted edge devices may be determined based on attributes of edge devices and requirement of the tasks. Each task may be assigned to a corresponding edge device. The edge agent may schedule the task to be executed on the corresponding edge device according to the defined process. The adapted edge devices may also be determined in other appropriate approaches, such as based on historical data, customs, etc. The manner of determination should not adversely limit the scope of this disclosure.

Referring now to FIG. 4, suppose for illustration purposes, that there are four tasks (comprising task_1, task_2, task_3, and task_4) and these tasks are adapted to be executed on the edge devices A, B, C, and D in sequence, respectively, according to the defined process herein. These tasks are merely examples and provided as a specific example for illustration and simplicity, which suggests no limitation to the present disclosure. In actual production or service practice, the tasks to be executed may be both massive and complex. Embodiments of the present disclosure can be applied to all kinds of tasks.

Once edge agent 423 receives the request for executing the above example tasks and defines the process, it may send a request for executing task_1 to edge device A, as shown by line 431. A container of edge device A may then run task_1 and a proxy of edge device A may send a running result to receiver module 4241, as shown by line 432. A running result of a task may be referred as a task result of the task herein. Each task may have a corresponding task result. Then, the dispatcher module 4242 may invoke the edge agent 423 to send a further request for executing task_2 to edge device B to continue the defined process, as shown by line 433. Similarly, edge device B may run task_2 and may send a task result to receiver module 4241, as shown by line 434. Then, the dispatcher module 4242 may invoke edge agent 423 to send another request for executing task_3 to edge device C to continue the execution of the defined process, as shown by line 435. Edge device C may send a task result to receiver module 4241, as shown by line 436, and edge agent 423 may send a further request for executing task_4 to edge device D, as shown by line 437. Once edge device D sends a task result of task_4 to receiver module 4241, as shown by line 438, the defined process may be completed. Lines 431-438 may show the defined process for executing the example tasks to accomplish a production mission or to implement a service function.

In this illustrative example, during the execution of the tasks on edge devices A, B, C, and D, if any one of the edge devices A, B, C, or D fails to run or finish an incoming task, interruption of the defined process may occur. To continue the execution process, edge agent 423 may re-assign the unfinished task to another edge device to replace the failure one. For example, if device B is broken down due to the unstable connection or other faults and edge agent 423 could not obtain status information from device B, shown by line 439, edge agent 423 may determine another edge device, such as device E, to replace device B. Task_2 may be re-assigned to edge device E as shown by dotted line 433'. Even if device B recovers during device E executing task_2 and device B delivers a task result prior to device E does, the task result of device B may not be adopted by receiver module 4241. Receiver module 4241 may still wait for the task result of task_2 from device E, as shown by dotted line 434', which may cause a waste of resources.

In this illustrative example, the availability of each edge device involved in the defined process is important for the efficiency of the execution as a whole, i.e., the failure or fault of any single device may affect the execution of the entire process. In this embodiment of an existing edge computing environment, the edge devices may be distributed or spotted devices, or even in a moving state, such as machines in the industrial park or mobile devices. Moreover, the Internet or cellular connections for the edge device may be unstable or intermittent. This situation may easily lead to failures of edge devices, and thereby, the tasks may fail to be executed. These failure(s) may last for a long time, or may last for only a short time and recover to continue the previous execution soon. In addition, the replacement edge device may fail once again before finishing the assigned task. Therefore, failures of the edge device in the edge environment may be frequent and complex, and it is desirable to manage tasks that fail to be executed in the edge environment to ensure high availability and high fault tolerance of the edge devices. It is also desirable to manage the tasks that are failed to be executed automatically to save resources and ensure high availability of edge services in the existing edge computing environment.

Accordingly, one feature and advantage of the present disclosure is that some embodiments may solve the problems described above as part of a solution for automatically managing failed tasks in the edge computing environment.

In the following, embodiments of the present disclosure will be described in detail with reference to FIGS. 5-8.

Figure 5:
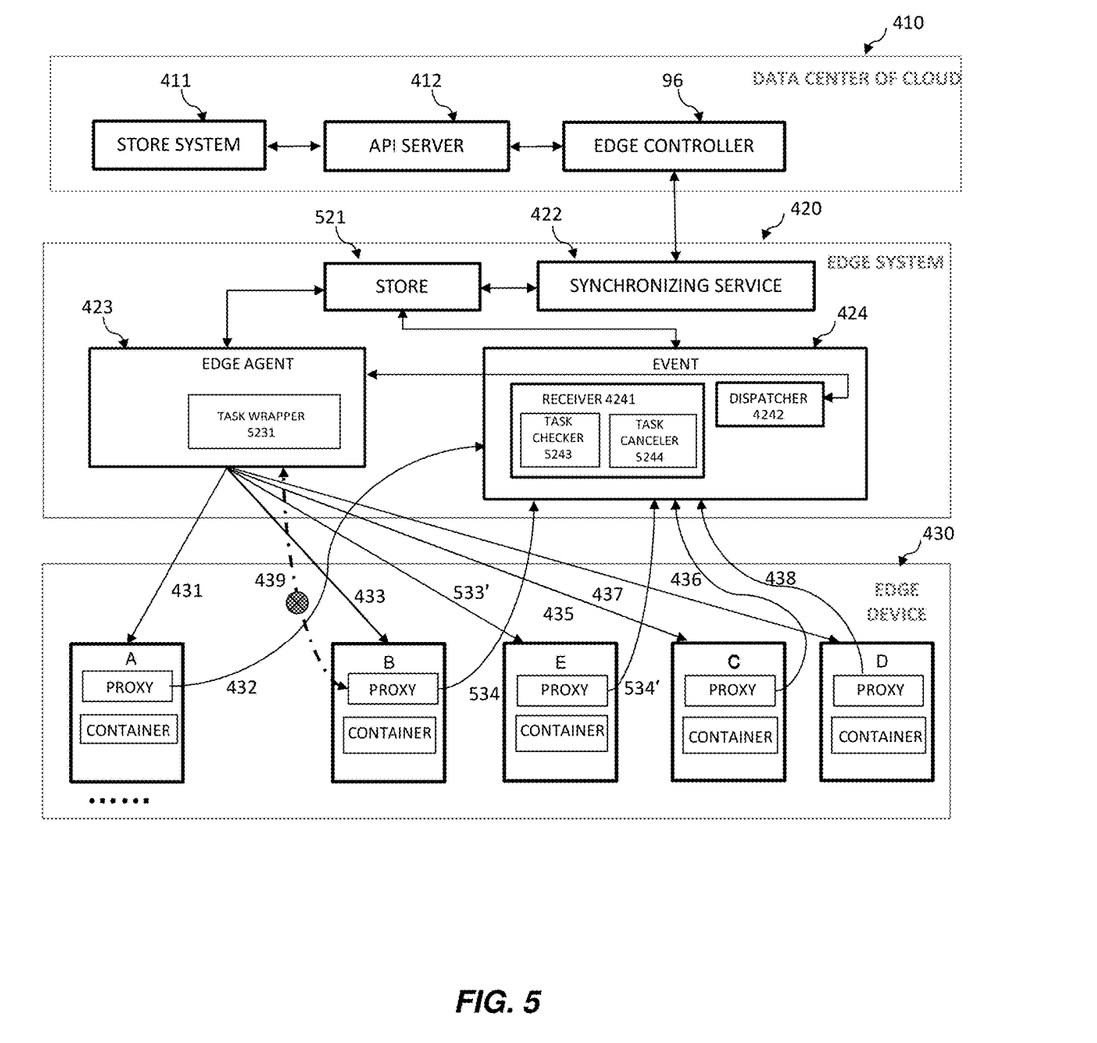
FIG. 5 depicts an example edge computing environment in accordance with some embodiments of the present disclosure.

FIG. 5 illustrates an example edge computing environment in accordance with embodiments of the present disclosure. Similar and/or corresponding modules or elements in FIG. 4 will be referred to by like reference numerals in FIG. 5 and will not be discussed herein. FIG. 5 provides only an illustration of an implementation environment and does not imply any limitations with regard to the environments in which different embodiments may be implemented. Many modifications to the illustration environment may be made.

Referring now to FIG. 5, a task wrapper module 5231 may be configured in the edge agent 423. The task checker module 5243 and the task canceler module 5244 may be configured in the receiver 4241. Compared with the existing computing environment shown in FIG. 4, these three modules may be configured to manage tasks that fail to be executed and may be implemented in software, hardware, firmware, and/or any combination thereof. The process of managing the tasks that failed to be executed is referred to as a failure management process herein. These modules are provided for the purpose of illustration only. The edge computing environment in accordance with some embodiments of the present disclosure may comprise more or fewer modules to achieve a similar function or intention. The modules, as well as the number of them, may be different and arranged in other manners.

According to embodiments of the present disclosure, the task wrapper module 5231, the task checker module 5243, and the task canceler module 5244 may be configured to manage task execution process when failure occurs. If the edge agent 423 could not obtain status information from any device during the defined process, the edge agent 423 may suspend the defined process and invoke the task wrapper module 5231 to start the failure management process. At the same time, the metadata information related to failure may be retrieved and stored in the store module 421. The task wrapper module 5231 may determine an edge device to replace the failure one and re-assign the task failed to be executed to the replacement device. The task checker module 5243 may be configured to check whether or not the received task result may be taken as the task result for the task. The task canceler module 5244 may be configured to cancel the running of replacement device if the task is finished. Once the task is finished, the failure management process may be ended and dispatcher module 4242 may invoke the edge agent to continue executing the remaining tasks according to the defined process.

In some embodiments and applications, if the replacement device also fails during the execution of the task, the task wrapper module 5231 may send the task that failed to be executed to still another device, and so on. The task wrapper module 5231 may determine what device is appropriate to execute the task, which is not discussed in detail herein. The actual production or service practice may be complex, and it may be possible that the replacement device also fails, therefore, it may be necessary to replace the failing device frequently in the edge computing environment. In order to simplify, the present disclosure only discusses the situation in which the replacement device is no longer failed, which should not adversely limit the scope of the disclosure.

Defined Process and Failure Management Process

According to embodiments of the present disclosure, a defined process for executing the tasks may refer to a process of executing the tasks by the adapted edge devices determined by the edge agent without considering any failure. The defined process for executing the tasks may be created by edge agent 423 once a request for executing the tasks is received. For the tasks in the illustrative example, the defined process is task_1, task_2, task_3, and task_4 in sequence, which are executed by edge device A, B, C, and D respectively, as shown by lines 431-438 in FIG. 4. A failure management process may refer to a sub-process of an entire process for execution the tasks, which may focus on managing the tasks that failed to be executed. In the case of no failure, the tasks may be executed according to the defined process. Once a failure occurs, however, the edge agent may invoke the failure management process to replace corresponding defined processes. The failure management process may be implemented by a task wrapper module 5231, a task checker module 5243, and a task canceler module 5244, as shown in FIG. 5, which may be referred as a "failure management system" collectively.

Figure 6:
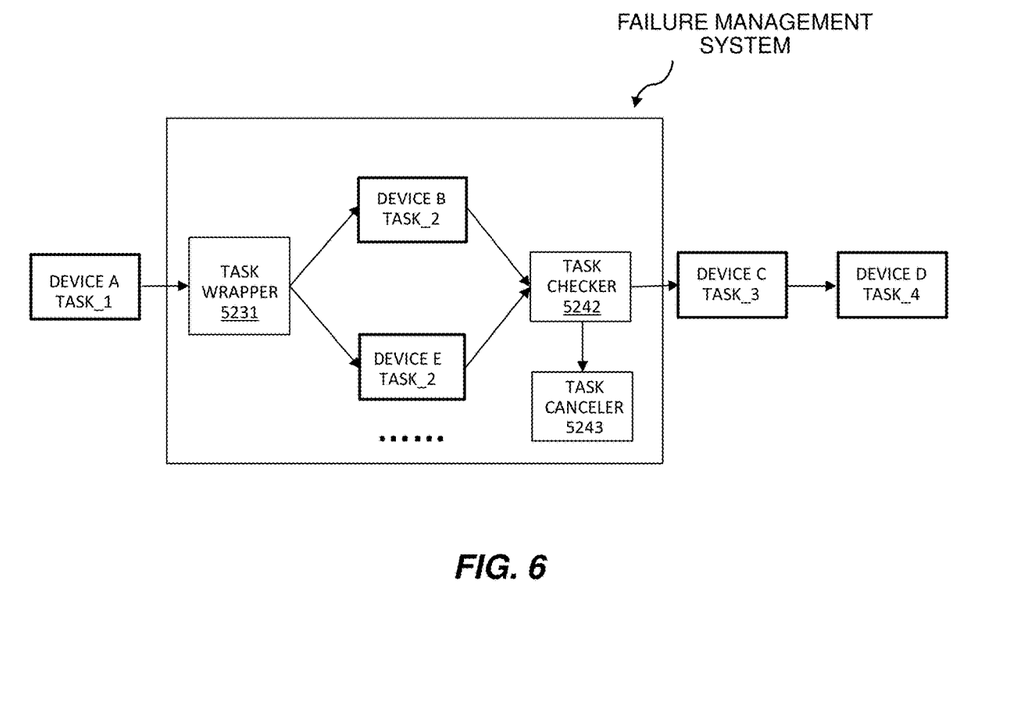
FIG. 6 depicts an example failure management system in accordance with some embodiments of the present disclosure.

An example failure management system embodiment suitable for executing the illustrative example tasks is shown as FIG. 6. According to some embodiments of the failure management process, the task checker module 5243 may check the task result both from devices B and E, instead of simply replacing device B with device E, without considering the running result of device B. According to embodiments of the present disclosure, the task result that is received first may be taken as the task result for the task. The detailed implementation of failure management process will be discussed in the following.

For the example tasks, during the execution of the tasks, if the edge agent 423 finds that device B is not available while the task run by device B is not finished, the edge agent 423 may suspend the defined process and may invoke the task wrapper module 5231 to start the failure management process. The task wrapper module 5231 may determine another device, such as device E, to replace the previous device, i.e., device B, and re-assign the request for executing task_2 to that other device, such as device E, as shown by line 533' in FIG. 5. The edge agent may set a time to live (TTL) period after sending the request for executing the task. The proxy of the edge device is expected to respond with the status thereof, such as "running" or "finished," to the edge agent during the TTL. For example, if the edge agent 423 could not receive a status report from device B during the TTL, the edge agent 423 may conclude that device B is failed or is not available and the edge agent 423 may start a failure management process. The obtaining of the status information may utilize any appropriate approach.

The edge device E may run task_2 and may send the task result to the receiver module 4241, as shown by line 534'. In some edge computing environments, many failures of the devices may be caused due to unstable or intermittent connection. It is likely in these environments that device B may resume operation in a short time and send a task result to the receiver module 4241, as shown by line 534. For the example tasks, there are three possible scenarios.

Figure 7A:
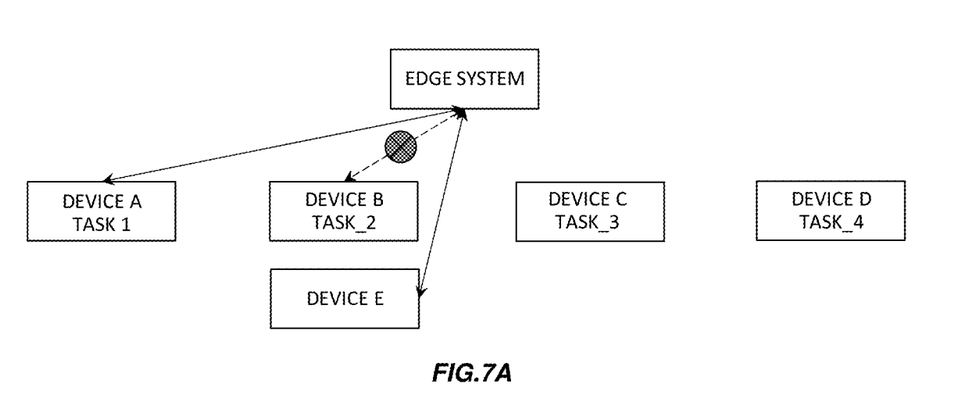
FIG. 7A depicts one example scenario of the failure management process in accordance with some embodiments of the present disclosure.

One scenario may be as shown in FIG. 7A. In this scenario, device B is always in a failure state, device E may send task result to the receiver module 4241, and the edge system may use a task result from device E as the task result for task_2.

Figure 7B:
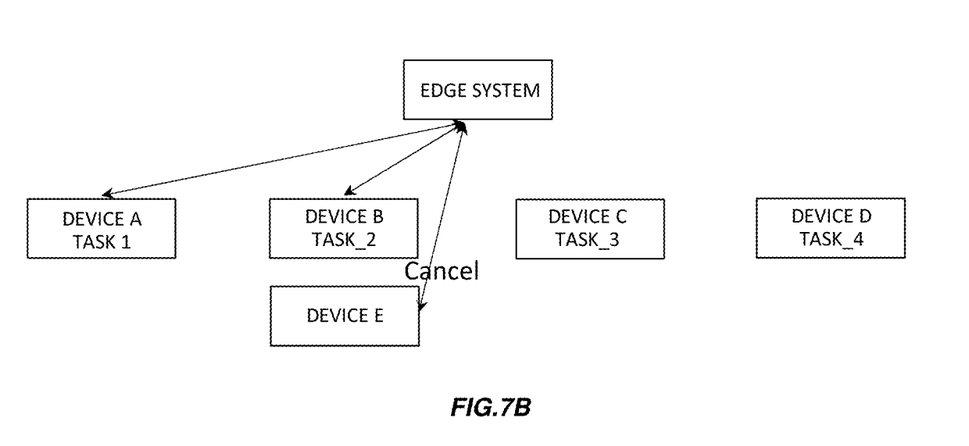
FIG. 7B depicts another example scenario of the failure management process in accordance with some embodiments of the present disclosure.

Another scenario may be as shown in FIG. 7B. In this scenario, device B resumes operation in a short time and sends a task result to the receiver module 4241. Device E is still running task_2 and device B may send a task result of task_2 to receiver module 4241 first. The edge system may then use the task result of device B as the task result for task_2. Device E, which is still running task_2, may be canceled. In this scenario, the resource may be saved.

Figure 7C:
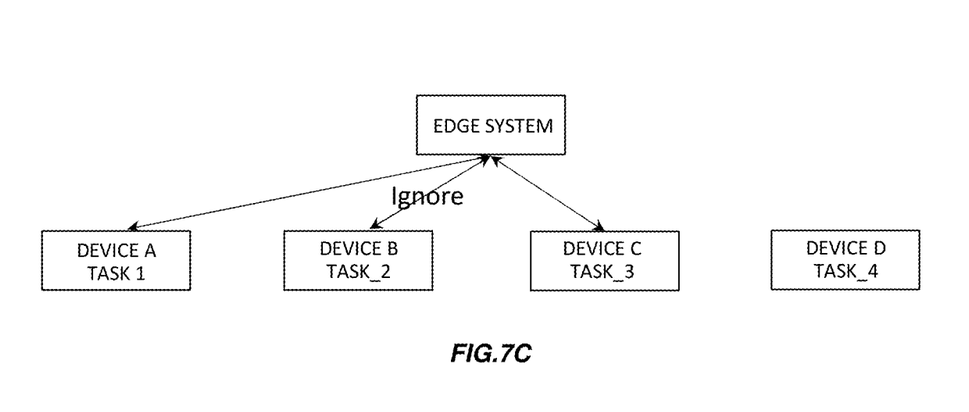
FIG. 7C depicts still another example scenario of the failure management process in accordance with some embodiments of the present disclosure.

Still another scenario may be as shown in FIG. 7C. In this scenario, device B resumes operation and sends a task result to the receiver module 4241. But, task_2 is finished, i.e., device E has sent a task result to receiver module 4241 before device B. Under this scenario, the edge system may ignore task result from device B.

Example Method

Figure 8:
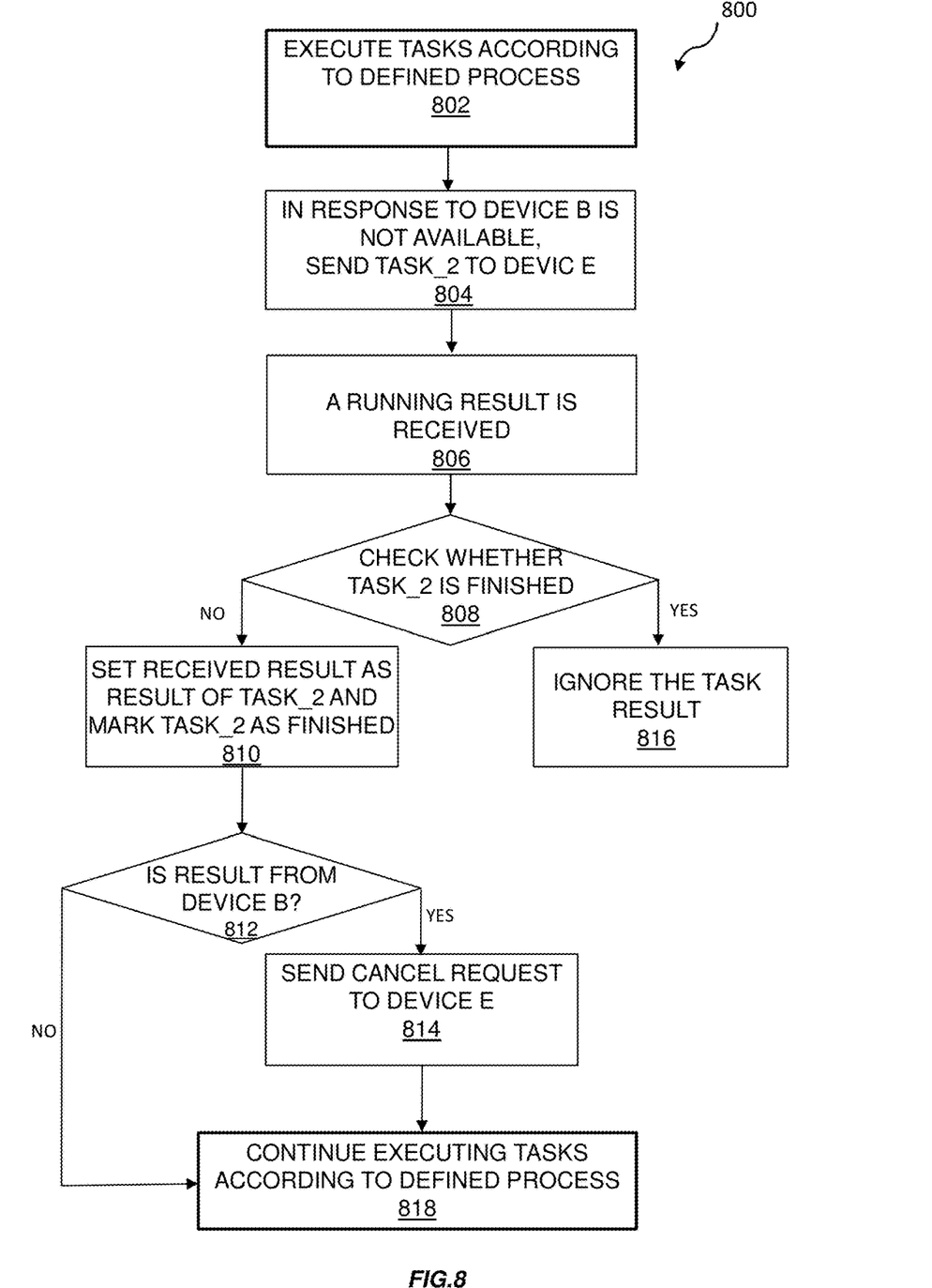
FIG. 8 depicts an example flow chart of a method for dynamically managing tasks in the edge computing environment according to some embodiments of the present disclosure.

FIG. 8 depicts an example flow chart of method 800 for dynamically managing tasks in the edge computing environment according to some embodiments of the present disclosure. The method 800 may be implemented in the environment shown in FIG. 5. The method 800 may comprise operations 802-818, wherein operations 802 and 818 may be operations according to the defined process, and operations 804-816 may be operations for failure management process corresponding to those three scenarios shown in FIGS. 7A-7C. Operations 804-816 may be implemented by the failure management system shown in FIG. 6.

At operation 802, as mentioned with reference to FIG. 4 and FIG. 5, once the edge agent 423 receives a request for executing tasks, the edge agent 423 may define the defined process mentioned before to execute the tasks on corresponding edge devices. Then, the edge agent 423 may schedule each task to be executed on a corresponding device according to the defined process.

At operation 804, in response to the edge agent 423 finding that the device B is not available while task_2 run by the device B is not finished, the edge agent 423 may suspend the defined process and invoke the task wrapper module 5231 to start a failure management process. The task wrapper module 5231 may send task_2 to another edge device, such as device E, to replace device B.

At operation 806, a task result may be received by the receiver module 4241. The task result may be a task result of task_2 from device E. It may also be a task result of task_2 from device B because device B may have recovered from a failure and continued running task_2.

At operation 808, the task checker module 5243 may check whether task_2 is marked as finished.

If task_2 has not been marked as finished, then at operation 810, the task checker module 5243 may determine that the received task result is the task result that is received first. The task checker module 5243 may take the received task result as the task result for task_2, and mark task_2 as finished.

At operation 812, the task checker 5243 may further check whether the received task result is from device B via the metadata information in store module 421. The metadata information may be shown as in Table 1. It should be understood that the data structure shown in Table 1 is provided for illustrative purpose without implying any limitation, and other data structures can also be applied, such as an XML file, a text (.txt) file, etc.

TABLE 1

| Device ID | Task ID |
|---|---|
| B | Task_2 |
| E | Task_2 |

If the task result is not from device B, the method 800 may directly proceed to operation 818. This branch may correspond to the scenario shown in FIG. 7A. If the received task result is from device B, task checker 5243 may set a variable "cancel_other_device" as true. In response to the variable "cancel_other_device" being set as true, the task canceler module 5242 may send a cancel request to device E at operation 814. Then, the method 800 may proceed to operation 818. This branch corresponds to the scenario shown in FIG. 7B. Once task_2 is marked as finished, the failure management process may end and the dispatcher module 4242 may invoke the edge agent to continue the remaining defined process.

If task_2 is marked as finished, then at operation 816, the received task result may be ignored. It may be determined that the task_2 has been finished by device E and device B sends the task result after device E. This branch corresponds to the scenario shown in FIG. 7C.

Figure 9:
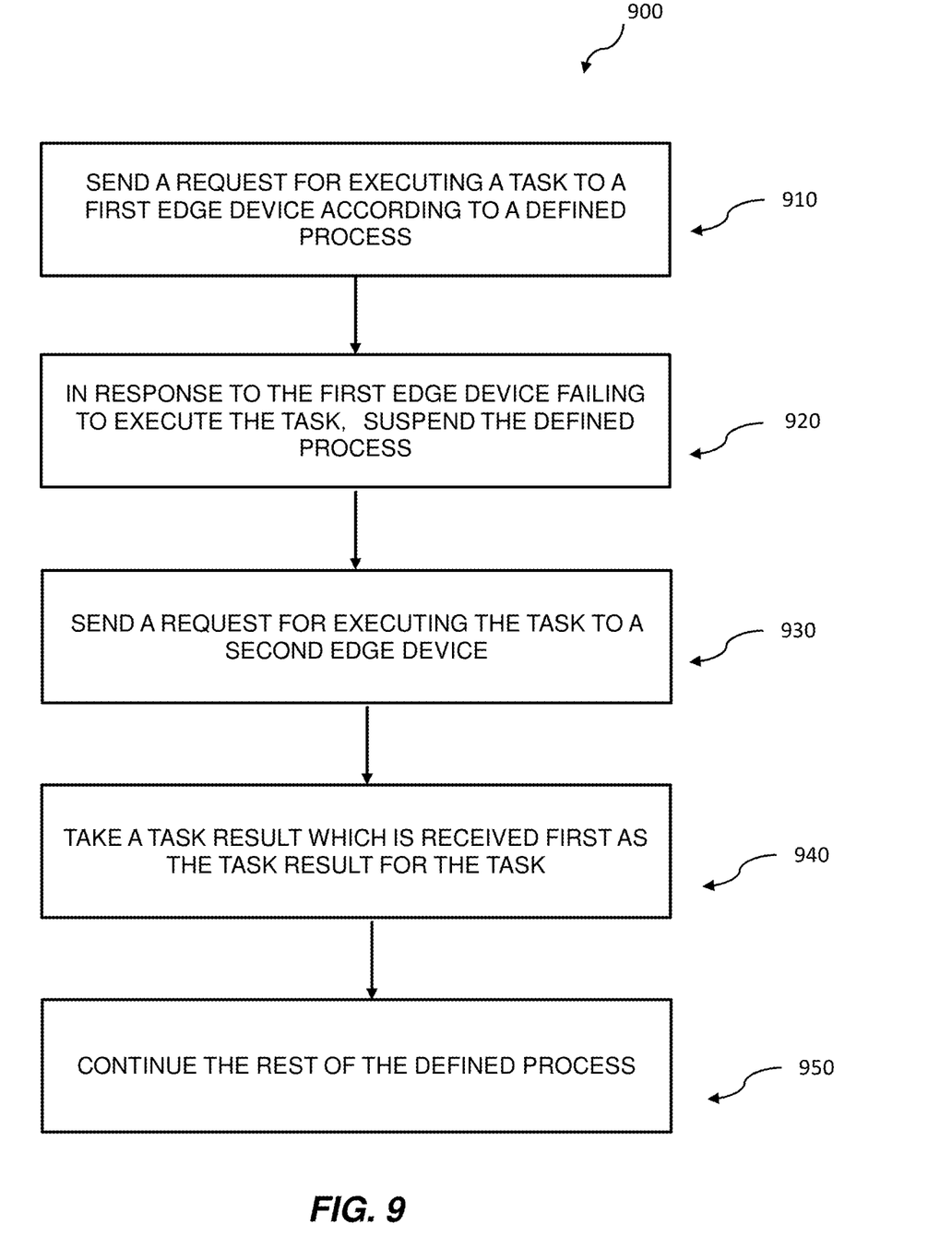
FIG. 9 depicts another example flow chart of a method for dynamically managing tasks in the edge computing environment according to some embodiments of the present disclosure.

FIG. 9 depicts another example flow chart of method 900 for dynamically managing tasks in the edge computing environment according to some embodiments of the present disclosure. For the purpose of discussion, method 900 will be described with reference to FIG. 5.

At operation 910, the edge agent 423 may send a request for executing a task to a first edge device according to a defined process, where the defined process may be used to schedule tasks to be executed on the edge devices. At operation 920, in response to the first edge device failing to execute the task, the edge agent 423 may suspend the defined process. At operation 930, the task wrapper module 5231 may send a request for executing the task to a second edge device. At operation 940, the task checker module 5243 may take a task result that is received first as the task result for the task, where the task result is from either the first edge device or the second edge device. At operation 950, dispatch 4242 may invoke the edge agent 423 to continue the rest of the defined process.

In some embodiments, at operation 940, in response to receiving a task result of the task, task checker module 5243 may check whether or not the task is marked as finished. In response to the task not being marked as finished, the task checker module 5243 may determine that the received task result is a task result that is received first, and may mark the task as finished. In response to the task being marked as finished, the task checker module 5243 may determine that the received task result is not a task result that is received first, and may ignore the received task result.

At operation 940 in some embodiments, the task checker module 5243 may check whether or not the received task result is from the first edge device. In response to the received task result being from the first edge device, task checker module 5243 may send an instruction to the second edge device to stop executing the task.

In some embodiments, in method 900, the store system 511 may obtain and store metadata information of the task and edge device. The metadata information may include at least one identifier from the following: ID of the task, ID of the first edge device, and ID of the second edge device.

The processing of managing the tasks according to embodiments of this disclosure may be implemented by the computer system/server 12 of FIG. 1.

Embodiments of the disclosure may include a system, a method, and/or a computer program product at any possible technical detail level of integration. The computer program product may include a computer readable storage medium (or media) having computer readable program instructions thereon for causing a processor to carry out aspects of the disclosure.

The computer readable storage medium may be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive the computer readable program instructions from the network and may forward the computer readable program instructions for storage in a computer readable storage medium within the respective computing/processing device.

Computer readable program instructions for carrying out operations of some embodiments may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which may execute via the processor of the computer or other programmable data processing apparatus, may implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that may implement aspects of the function/act specified in the flowchart and/or block diagram block or blocks.

The computer readable program instructions may also be loaded onto a computer, other programmable data processing apparatus, or other device to cause a series of operations to be performed by the computer, other programmable apparatus, or other device to produce a computer implemented process, such that the instructions that execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the disclosure.

What is claimed is:

1. A computer-implemented method comprising, by one or more processors:
    sending a request for executing a task to a first edge device according to a defined process, wherein the defined process is used to schedule tasks to be executed on edge devices;
    in response to the first edge device failing to generate a result of the task within a set period of time, suspending the defined process;
    sending a request for executing the task to a second edge device, in response to the failing to generate the result of the task within the set period of time;
    receiving a task result from at least one of the first edge device and the second edge device:
    in response to receiving the task result of the task, checking whether the task is marked as finished;
    in response to the task not being marked as finished, determining that the received task result is the task result that is received first
    marking the task as finished;
    checking whether the received task result of the task is from the first edge device;
    in response to the received task result being from the first edge device, sending an instruction to the second edge device to stop executing the task; and
    continuing the rest of the defined process.

2. The method of claim 1, further comprising:
    receiving a second task result in response to the task being marked as finished, determining that the second received task result is not the task result that is received first, and ignoring the second received task result.

3. The method of claim 1, further comprising obtaining information of the task from the task result of the task for checking whether the received task result is from the first edge device.

4. The method of claim 3, wherein the information comprises information selected from the group consisting of: an ID of the task and an ID of the edge device.

5. The method of claim 1, further comprising, by an edge agent:
- requesting status information about the first edge device; and
- in response to a failure to receive the status information, invoking a task wrapper module to start a failure management process.

6. The method of claim 5, further comprising, by the task wrapper module:
- identifying the second edge device to replace the first edge device; and
- reassigning the task to the second edge device.

7. A computer system, comprising:
- one or more processors;
- a computer-readable memory coupled to the processors, the computer-readable memory comprising instructions that when executed by the processors:
  - send a request for executing a task to a first edge device according to a defined process, wherein the defined process is used to schedule tasks to be executed on edge devices;
  - in response to the first edge device failing to generate a result of the task within a set period of time, suspend the defined process;
  - send a request for executing the task to a second edge device, in response to the failing to generate the result of the task within the set period of time;
  - receive a task result from at least one of the first edge device and the second edge device:
  - in response to receiving the task result of the task, check whether the task is marked as finished;
  - in response to the task not being marked as finished, determine that the received task result is the task result that is received first
  - mark the task as finished;
  - check whether the received task result of the task is from the first edge device;
  - in response to the received task result being from the first edge device, send an instruction to the second edge device to stop executing the task; and
  - continuing the rest of the defined process.

8. The computer system of claim 7, further comprising:
- receive a second task result
- in response to the task being marked as finished, determine that the second received task result is not the task result that is received first, and
- ignore the second received task result.

9. The computer system of claim 7, further comprising obtaining information of the task from the task result of the task for checking whether the received task result is from the first edge device.

10. The computer system of claim 9, wherein the information comprises information selected from the group consisting of: an ID of the task and an ID of the edge device.

11. A computer program product, comprising a computer readable storage medium having program instructions embodied therewith, the program instructions executable by a processor to cause the processor to:
- send a request for executing a task to a first edge device according to a defined process, wherein the defined process is used to schedule tasks to be executed on edge devices;
- in response to the first edge device failing to generate a result of the task within a set period of time, suspend the defined process;
- send a request for executing the task to a second edge device, in response to the failing to generate the result of the task within the set period of time;
- receive a task result from at least one of the first edge device and the second edge device.
- in response to receiving the task result of the task, check whether the task is marked as finished;
- in response to the task not being marked as finished, determine that the received task result is the task result that is received first
- mark the task as finished;
- check whether the received task result of the task is from the first edge device;
- in response to the received task result being from the first edge device, send an instruction to the second edge device to stop executing the task; and
- continuing the rest of the defined process.

12. The program product of claim 11, further comprising:
- in response to the task being marked as finished, determining, by one or more processor, that the received task result is not the task result that is received first, and
- ignoring, by one or more processors, the received task result.

13. The program product of claim 11, further comprising obtaining information of the task from the task result of the task for checking whether the received task result is from the first edge device.

14. The program product of claim 13, wherein the information comprises information selected from the group consisting of: an ID of the task and an ID of the edge device.

* * * * *